(12) United States Patent
Telep

(10) Patent No.: US 10,002,543 B2
(45) Date of Patent: Jun. 19, 2018

(54) SYSTEM AND METHODS FOR TRANSFORMING LANGUAGE INTO INTERACTIVE ELEMENTS

(71) Applicant: Knotbird LLC, Gloucester, MA (US)

(72) Inventor: Richard Daniel Telep, Gloucester, MA (US)

(73) Assignee: Knotbird LLC, Gloucester, MA (US)

( * ) Notice: Subject to any disclaimer, the term of this patent is extended or adjusted under 35 U.S.C. 154(b) by 153 days.

(21) Appl. No.: 14/932,917

(22) Filed: Nov. 4, 2015

(65) Prior Publication Data

US 2016/0125753 A1 May 5, 2016

Related U.S. Application Data

(60) Provisional application No. 62/074,679, filed on Nov. 4, 2014.

(51) Int. Cl.
| | |
|---|---|
| *G09B 5/06* | (2006.01) |
| *G10L 15/02* | (2006.01) |
| *G10L 15/22* | (2006.01) |
| *G10L 15/26* | (2006.01) |
| *G09B 17/00* | (2006.01) |
| *G06F 17/27* | (2006.01) |
| *G10L 21/10* | (2013.01) |
| *G10L 25/48* | (2013.01) |

(52) U.S. Cl.
CPC ......... *G09B 17/006* (2013.01); *G06F 17/273* (2013.01); *G06F 17/2755* (2013.01); *G09B 5/06* (2013.01); *G10L 15/265* (2013.01); *G10L 21/10* (2013.01); *G10L 25/48* (2013.01); *G10L 15/02* (2013.01); *G10L 2015/025* (2013.01); *G10L 2015/225* (2013.01)

(58) Field of Classification Search
CPC ......... G10L 2015/025; G10L 2015/223; G10L 2015/225; G10L 15/265
See application file for complete search history.

(56) References Cited

U.S. PATENT DOCUMENTS

| | | | | | |
|---|---|---|---|---|---|
| 5,230,037 | A | * | 7/1993 | Giustiniani | G10L 15/14 704/200 |
| 6,070,140 | A | * | 5/2000 | Tran | G06F 1/3203 704/232 |
| 6,212,497 | B1 | * | 4/2001 | Araki | G10L 15/26 382/229 |
| 6,937,984 | B1 | * | 8/2005 | Morgan | G10L 15/22 704/270 |
| 7,406,417 | B1 | * | 7/2008 | Hain | G10L 13/08 704/260 |
| 8,332,206 | B1 | * | 12/2012 | Sadovsky | G06F 17/2735 704/10 |

(Continued)

*Primary Examiner* — Eric Yen
(74) *Attorney, Agent, or Firm* — Hojka Qadeer, LLC; Cory L. Hojka

(57) ABSTRACT

A computer operable method is described for transforming phonemes, graphemes, and other language structures into interactive elements. The method may comprise, receiving a word, wherein the word consists of a group of phonemes; forming a group of graphemes, wherein the group of graphemes is constructed using information relating to the group of phonemes; and forming a group of manipulatives, wherein the group of manipulatives is constructed using information relating to the group of phonemes or the group of graphemes.

8 Claims, 31 Drawing Sheets

(56) References Cited

U.S. PATENT DOCUMENTS

| | | | | |
|---|---|---|---|---|
| 8,898,064 B1* | 11/2014 | Thomas | G10L 15/08 | 704/270 |
| 9,031,831 B1* | 5/2015 | Levchenko | G06F 17/2735 | 345/684 |
| 2003/0007018 A1* | 1/2003 | Seni | G06F 3/0237 | 715/864 |
| 2003/0040909 A1* | 2/2003 | Ghali | G10L 15/187 | 704/235 |
| 2003/0212961 A1* | 11/2003 | Soin | G06F 3/04883 | 715/271 |
| 2003/0229497 A1* | 12/2003 | Wilson | G09B 5/04 | 704/270.1 |
| 2003/0233237 A1* | 12/2003 | Garside | G06F 3/038 | 704/270 |
| 2005/0060138 A1* | 3/2005 | Wang | G06F 3/018 | 704/1 |
| 2005/0192805 A1* | 9/2005 | Kudoh | G10L 15/04 | 704/248 |
| 2006/0149558 A1* | 7/2006 | Kahn | G10L 15/063 | 704/278 |
| 2007/0005338 A1* | 1/2007 | Vrijsen | G06F 17/2735 | 704/3 |
| 2007/0083369 A1* | 4/2007 | McCuller | G10L 15/187 | 704/254 |
| 2008/0059193 A1* | 3/2008 | Huang | G10L 15/00 | 704/260 |
| 2009/0150153 A1* | 6/2009 | Li | G10L 13/08 | 704/254 |
| 2009/0157383 A1* | 6/2009 | Cho | G06F 17/30637 | 704/8 |
| 2009/0228799 A1* | 9/2009 | Verbeeck | G06F 17/30743 | 715/727 |
| 2010/0057461 A1* | 3/2010 | Neubacher | G10L 15/063 | 704/243 |
| 2011/0093259 A1* | 4/2011 | Saffer | G10L 15/06 | 704/9 |
| 2011/0282667 A1* | 11/2011 | Hernandez-Abrego | G10L 15/19 | 704/254 |
| 2014/0052450 A1* | 2/2014 | Cheong | H04N 21/42203 | 704/275 |
| 2014/0122072 A1* | 5/2014 | Stokes | G10L 13/00 | 704/235 |
| 2015/0302001 A1* | 10/2015 | Walther | G10L 13/04 | 704/9 |

\* cited by examiner

Figure 7
f　　　v
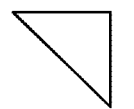 
Figure 8
jump
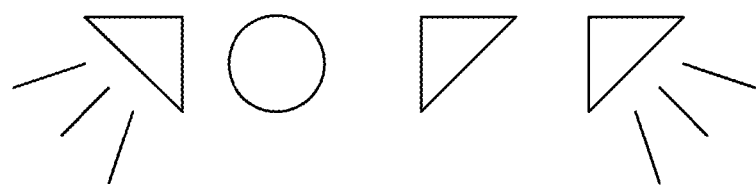

Figure 9
bike
biking
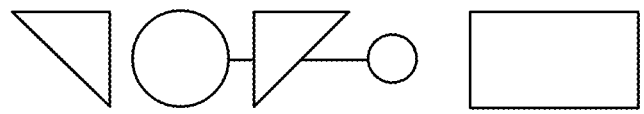

boil bat bend mim mix glass stark

Figure 29
batch
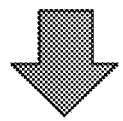
beach

Figure 30
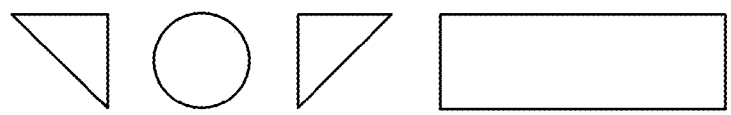
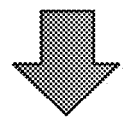
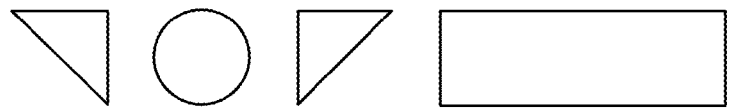

Figure 31
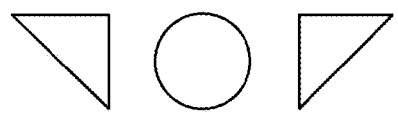
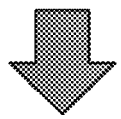
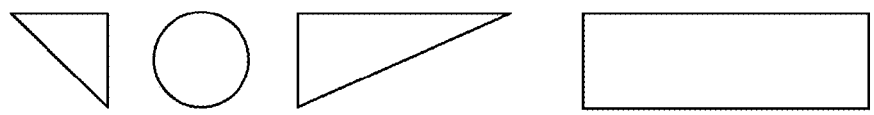

Figure 32
hoping
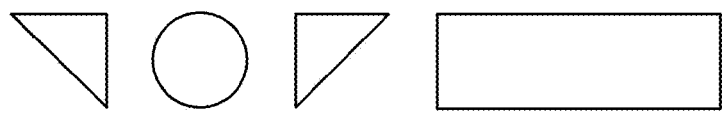
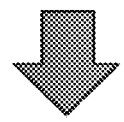
hopeful
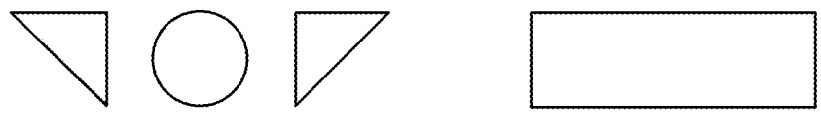

Figure 33
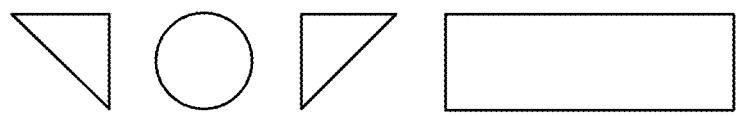
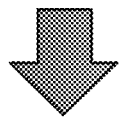
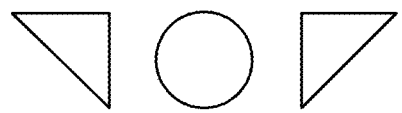

Figure 34
strict
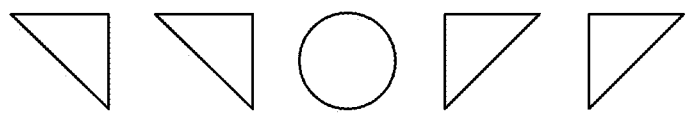
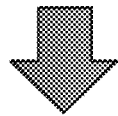
restrict
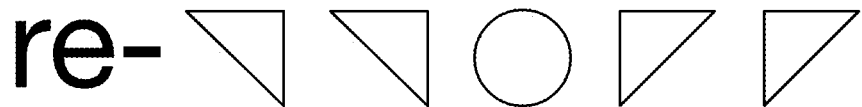

Figure 35
constrict
con- 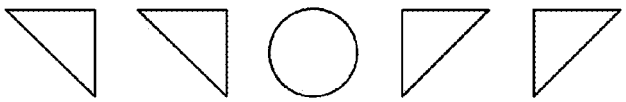
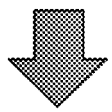
restrict
re- 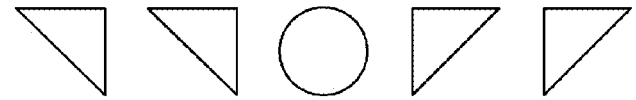

Figure 36
constrict
con- 
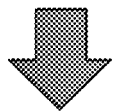
strict

Figure 38

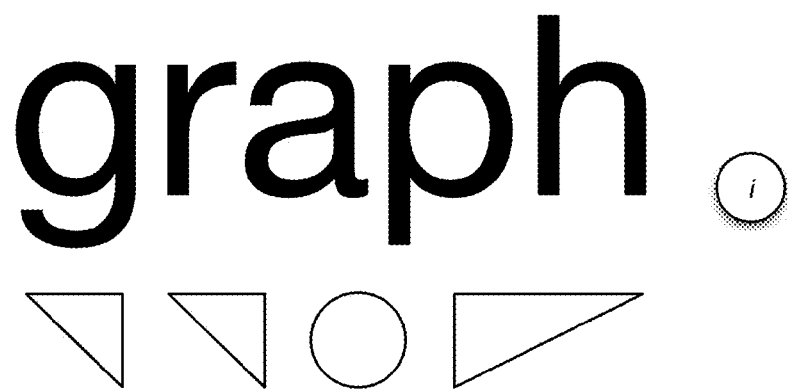

Figure 39 noun
1. a diagram representing a system of connections or interrelations among two or more things by a number of distinctive dots, lines, bars, etc.
2. a series of points, discrete or continuous, as in forming a curve or surface, each of which represents a value of a given function.
Also called linear graph. a network of lines connecting points.
3. a written symbol for an idea, a sound, or a linguistic expression.

verb (used with object)
4. to draw (a curve) as representing a given function.
5. to represent by means of a graph.

http://dictionary.reference.com/browse/graph

Figure 40
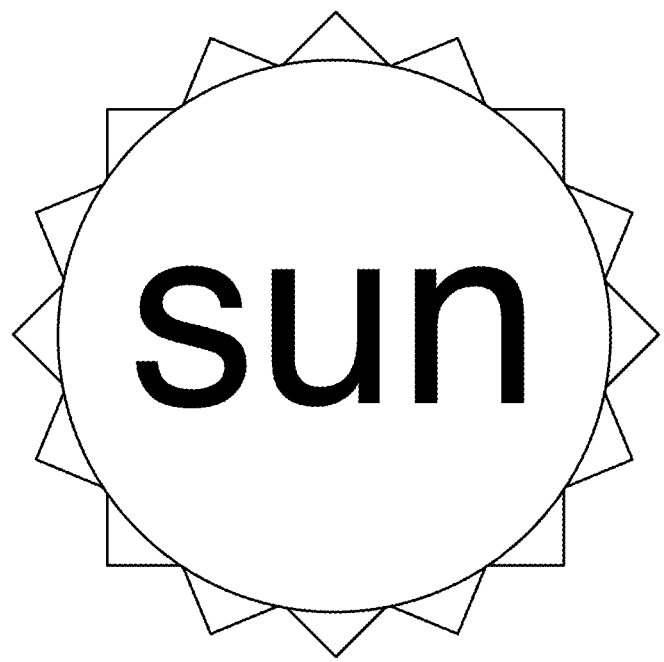
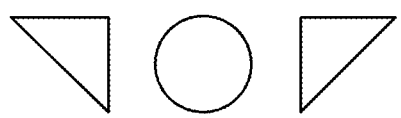

Figure 41
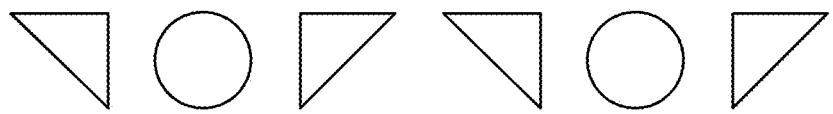
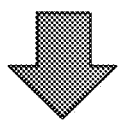
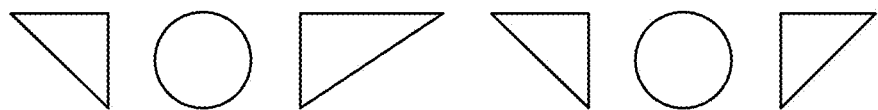

Figure 42
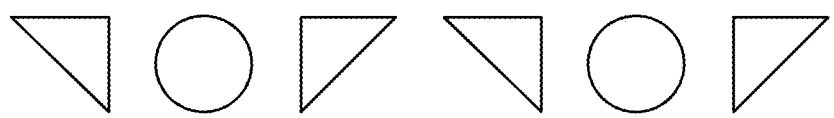
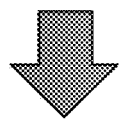
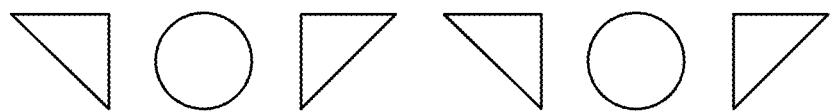

Figure 43
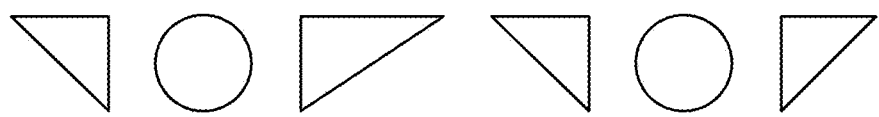
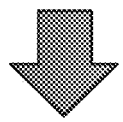
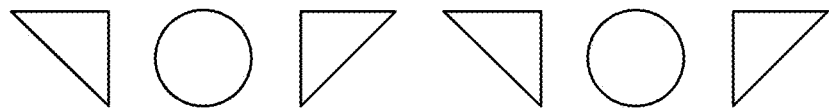

Figure 44
rock-rip
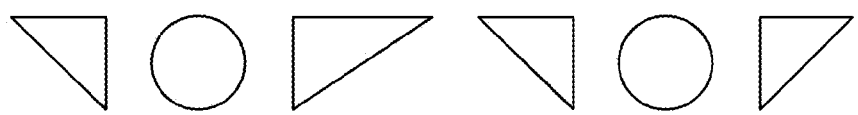
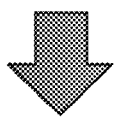
ro-crip
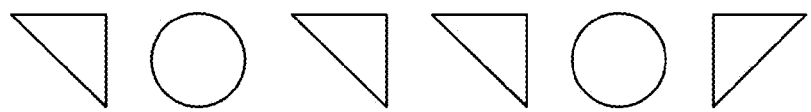

Figure 45
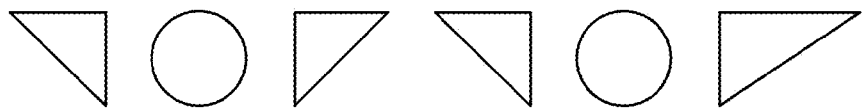
▽◯▷ ▽◯▷
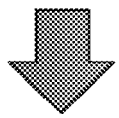
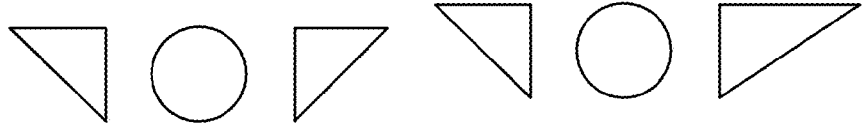
▽◯▷ ▽◯▷

SYSTEM AND METHODS FOR TRANSFORMING LANGUAGE INTO INTERACTIVE ELEMENTS

CROSS-REFERENCE TO RELATED APPLICATIONS

This application claims priority from U.S. Provisional Patent Application Ser. No. 62/074,679, filed Nov. 4, 2014; the entire content of which is incorporated herein by reference.

BACKGROUND

Field of the Invention

The present disclosure relates to systems and methods for transforming phonemes, graphemes, and other language structures into interactive elements.

Description of the Related Art

Phonemes may be any of a small set of units, often about 20 to 60 in number, and different for each language, considered to be the basic distinctive units of speech sound by which morphemes, words, and sentences are represented. Similarly, graphemes may be a minimal unit of a writing system, such as a set of orthographic symbols (letters or combinations of letters) in a given language that serve to distinguish one word from another and, to some degree, correspond or represent phonemes in an alphabetic writing system.

According to the United States National Reading Panel, Phonemic Awareness training involves teaching students to focus on and manipulate phonemes in spoken syllables and words. For example, Phonemic Awareness training may involve asking a student to demonstrate the ability to focus on and manipulate phonemes through phoneme isolation, which requires recognizing individual sounds in words (e.g., identify the first sound in "paste"); phoneme identity, which requires recognizing the common sound in different words (e.g., identify the sound that is the same in "bike", "boy", and "bell"); phoneme categorization, which requires recognizing the word with the odd sound in a sequence of three or four words (e.g., identify which word does not belong in "bus", "bun", and "rug"); phoneme blending, which requires listening to a sequence of separately spoken sounds and combining them to form a recognizable word (e.g., identify the word that is composed of the phonemes /s/ /k/ /u/ /l/); phoneme segmentation, which requires breaking a word into its sounds by counting the sounds (e.g., identify how many phonemes are there in "ship"); or phoneme deletion, which requires recognizing what word remains when a specified phoneme is removed (e.g., identify the word created if the phoneme /s/ is removed from "smile"). The United States National Reading Panel also found that Phonemic Awareness training that teaches such phoneme manipulation with letters helped normally developing readers and at-risk readers acquire Phonemic Awareness better than Phonemic Awareness instruction without letters.

The United States National Reading Panel also noted that there is general agreement in the experimental literature that computer technology can be used to deliver a variety of types of reading instruction successfully, but that there has been relatively little research in this important area.

SUMMARY

A computer operable method is described for transforming phonemes, graphemes, and other language structures into interactive elements. The method may comprise, receiving a word, wherein the word consists of a group of phonemes; forming a group of graphemes, wherein the group of graphemes is constructed using information relating to the group of phonemes; and forming a group of manipulatives, wherein the group of manipulatives is constructed using information relating to the group of phonemes or the group of graphemes.

BRIEF DESCRIPTION OF THE DRAWINGS

FIG. 5 shows an example of how a manipulative may be adjusted based on the length of a grapheme.

FIG. 6 shows an example of how different manipulatives may be used based on whether a phoneme is a vowel or consonant.

FIG. 7 shows an example of how different manipulatives may be used based on whether a phoneme is voiced or unvoiced.

FIG. 8 shows an example of how different manipulatives may be used based on whether a phoneme is pronounced without duration.

FIG. 9 shows an example of how different manipulatives may be used based on whether a phoneme has a silent letter or if an affix is presented.

FIG. 29 shows an example of a change request to substitute a phoneme, grapheme, or manipulative and the resulting change of a grapheme.

FIG. 30 shows an example of a change request to substitute a phoneme, grapheme, or manipulative where an affix is present.

FIG. 31 shows an example of a change request to add an affix.

FIG. 32 shows an example of a change request to change an affix.

FIG. 33 shows an example of a change request to remove an affix.

FIG. 34 shows an example of a change request to add an affix where the manipulative is represented by letters and a hyphen.

FIG. 35 shows an example of a change request to change an affix where the manipulative is represented by letters and a hyphen.

FIG. 36 shows an example of a change request to remove an affix where the manipulative is represented by letters and a hyphen.

FIG. 38 shows an example of an informational button.

FIG. 39 shows an example of an informational display.

FIG. 40 shows an example of a word located within a visual image.

FIG. 41 shows an example of a change request to substitute a syllable.

FIG. 42 shows an example of a change request to relocate a syllable.

FIG. 43 shows an example of a change request to relocate a phoneme, grapheme, or manipulative that results in new syllables.

FIG. 44 shows an example of a change request to relocate a hyphen that results in new syllables.

FIG. 45 shows an example of a change request to relocate an accent from one syllable to another.

DETAILED DESCRIPTION OF THE PREFERRED EMBODIMENTS

Figure 1A:
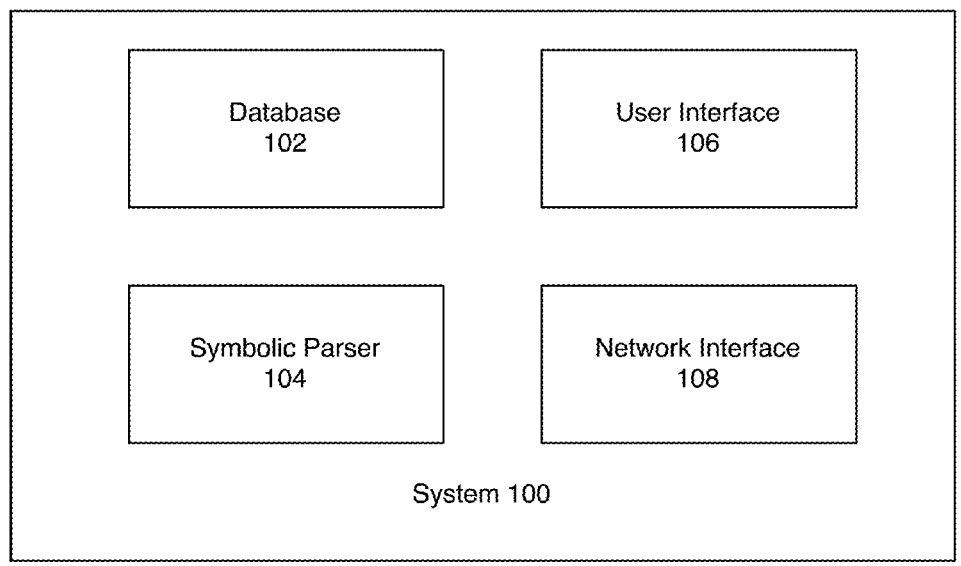
FIG. 1A shows an example of a system for phonetic transformation and manipulation.

References herein to specific phonemes may be provided in Arpabet encoding (See, e.g., http://en.wikipedia.org/wiki/Arpabet) and indicated by using brackets on each side of a phoneme (e.g., [S]). Arpabet pronunciation clues may be given alongside in italics (e.g., [AA R] (i.e., large [L AA R JH])). References herein to specific graphemes may be indicated by using double quotes on each side of a grapheme (e.g., "s"). Words or syllables composed of graphemes may also be indicated herein by using double quotes on each side of the word or syllable (e.g., "cat"). Affixes may be indicated with a hyphen, with suffixes following the hyphen (e.g., "-ing") and prefixes preceding it (e.g., "pre-"). These specific forms of reference for phonemes, graphemes, affixes, etc. are used herein solely for the exemplary purpose of distinguishing between examples of phonemes, graphemes, and affixes and are not a limitation on any form of encoding that may be used by the methods and systems disclosed herein. For example, a phoneme record described below may contain information relating to an International Phonetic Alphabet encoding or other encodings known in the art.

Methods and systems are disclosed herein for transforming phonemes into graphemes and manipulatives. For example, a user may be presented with a word on an interactive computer display, such as a 2D Touch screen, a haptic display, or a 3D touch screen (e.g., inForm: http://tangible.media.mit.edu/project/inform/). Positioned near the word may be manipulatives (e.g., colored shapes to touch and move), which represent the phonemes in the word.

The appearance and behavior of the manipulatives may act as significant decoding cues. The treatment of graphemes in a word and manipulatives may be co-interactive. For example, touching a manipulative may cause its state to change and may also cause a corresponding state change in the related grapheme. The reverse may also be true, e.g., touching a grapheme or grapheme constituent (e.g., a single letter in a grapheme composed of multiple letters) may cause the grapheme state to change and also may cause the corresponding manipulative to change state. An alphabetic principle, in which graphemes and phonemes have correspondence, may thus be demonstrated and explored interactively.

Other significant information about the phoneme may be indicated by an interface via the methods and systems described herein. For example, animation, video, audio, image may be invoked by interaction with a phoneme, grapheme, or manipulative. For example, the user may select from audio or video clips that demonstrate the articulation or manner of production of a phoneme. This collection may be either stock clips or user-submitted. An example animation may be a front-to-back motion of an object in connection with a diphthong, during the pronunciation of which the tongue moves from front of the mouth to the back. Another aspect is that a learner's own voice recordings, images or videos may be associated with phonemes.

On a change request to a grapheme or manipulative, a determination may be made as to validity of the word or words in the solution set (e.g., the nonsense word "stesk" may have high validity, while the nonsense word "sphleque" may have low validity). The response to change requests may be handled according to user settings or other instructions in the system's records. For example, the change request may be refused because nonsense words are not permitted by the user settings. If a change request is permitted, its validity may be indicated visually or not.

In some embodiments, the user settings or other instructions in the system's records may specify how to rank solutions, such as preferring real words to nonsense, preferring high frequency real words to low frequency real words, or preferring phonetically irregular words to regular words. Based on the rank determined by the system if the change request were to be performed, the system may accept or deny the request, such as by using one or more threshold values. These threshold values may be adjusted by user settings or other instructions in the system's records. As changes are selected and displayed, the resulting words may be recorded and used to adjust such thresholds or providing additional ranking information. For example, the number of times a word has been shown in a session may be recorded and the higher the number the lower rank it may be assigned.

Through this approach, the validity of change requests may be governed by a pedagogical order. For example, the user settings may specify one or more thresholds that only allow the system to accept change requests resulting in words with short vowels. As a further example, once enough words with short vowels have been displayed according to the user settings, the system may adjust the thresholds to also accept change requests resulting in words with silent-e vowels.

Phonemes may be dynamically respelled in a word as an incidental result of a phoneme change elsewhere in the word. For example, given the word "back," in which the final consonant [K] is spelled "ck", if the vowel is changed to "ea", the final consonant [K] may be respelled as "k" according to orthographic conventions to form the word "beak." The option of whether to permit respelling of unchanged phonemes may be configurable in the user settings.

Other significant information about a word may be indicated visually via an interface, such as whether the word is real or nonsense, the word's part of speech (e.g., noun, verb), or a picture of the object that the word represents if the word has a concrete referent (e.g., 'book').

The methods and systems described herein may begin the presentation of words with any real or nonsense word in the system, or they may begin by requesting a randomly selected word that conforms to a specified pattern. For example, the user settings may request starting words that conform to some part of a pattern contained in an input word, (e.g., only start on words that begin with the onset of "back" (e.g., "bath", "ban", . . . ). Or the user settings may request that selections be made from a list of common instructional patterns, (e.g., begin with [AY] spelled "ai": "rain", "pain", . . . ).

Affixes may be added to the root word (e.g., prefixes such as "in-", "dis-", "pre-" or common suffixes such as "-ing", "-ful", "-ness"). These affixes may be represented with manipulatives and may be subject to change requests. For example, if a change request is made for an affix, the root word might be respelled according to orthographic conventions of prefix or suffix addition (e.g., "hopeful" versus "hoping").

A user may move freely through valid change requests, such as going forward and backward (e.g., by requesting changes or undoing the changes) or reverting back to an initial word. The user settings may also request starting words of a given type, in this way a patterned list of words may be obtained.

The user settings or other records in the system may allow for different levels of control over the display of graphemes or manipulatives, such that any permissible grapheme or manipulative may be displayed or hidden. For example, a word may be initially displayed using graphemes and manipulatives. Certain manipulatives may then be gradually removed, thereby prompting the user to decode the word by using only the cues inherent in the graphemes.

Presented words may be a single syllable or have more than one syllable, such as through the addition of common affixes or by the chaining together of multiple syllables. For example, real and nonsense single syllable words may take any form, or type, that is phonotactically valid (e.g., Consonant-Vowel-Consonant (CVC), CVCC, CCVC). In a multi-syllable word the syllables themselves may become subject to the change requests. Individual syllables may optionally be indicated visually (e.g., by space, shading, hyphens) or accents indicated (e.g., using diacritics, or bold typeface). In multi-syllable nonsense words, the indicators of accented syllables may be moved from syllable to syllable arbitrarily. For example, the word "sprothang" may be shown as having the accent on the initial syllable, e.g., "SPRO-thang", or on the final syllable, e.g., "spro-THANG". Another aspect of multi-syllable word interactivity, is that a multi-syllable nonsense word may be syllabicated in multiple ways. For example, the word "jostap" may be syllabicated "jo-stap" or "jos-tap".

The typeface in which the graphemes are presented may also be varied using the system and methods described herein. For example, graphemes may be presented using a typeface of a highly readable type (in which, for example, grapheme distinctions are accentuated visually). The size and case of the type in which the word is displayed also may vary depending on the user settings.

FIG. 1A shows an example of a System 100 for phonetic transformation and manipulation. System 100 may consist of a Database 102, Symbolic Parser 104, a User Interface 106 and a Network Interface 108.

Figure 1B:
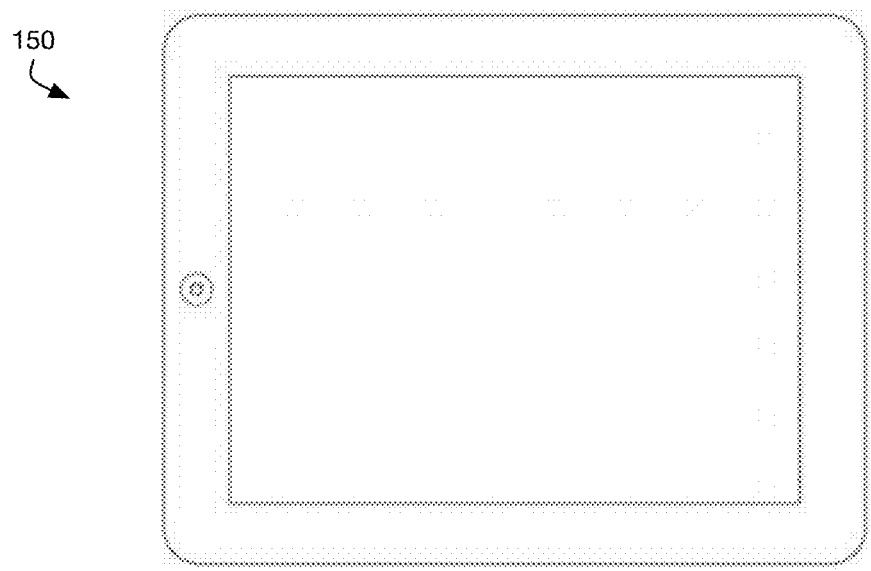
FIG. 1B shows an example of a device that may be used to implement the systems and methods described herein.

FIG. 1B shows an embodiment of a computing Device 150, which may be used to implement System 100. As shown, Device 150 is a tablet-based computing device, such as an iPad. Other devices or systems of devices may be used to implement System 100, such as a personal computer, cloud computing facilities, or any other computing device or system with processing, storage, and communication abilities.

Database 102 may contain phoneme records, grapheme records, syllable records, orthographic records, manipulative records, dictionary records, user settings, and any other information used by the systems and methods described herein.

A phoneme record may include any information regarding a phoneme, such as grapheme, manipulative, syllable, orthographic, or dictionary records associated with the phoneme and instructions relating to the use of such associated records. The phoneme record may also contain examples of the phoneme, such as example words of the phoneme or audio/visual recordings describing the phoneme. In addition, the phoneme record may also contain further information regarding the phoneme, such as whether the phoneme represents a consonant or vowel, whether it is voiced or unvoiced, its duration, its manner of articulation, etc. The phoneme record may contain any further information known in the art to characterize phonemes. The phoneme record may also contain information regarding other phoneme records related to the phoneme record, such as allophones.

A grapheme record may contain any written or visual representations of a grapheme, such as alphabetic letters, typographic ligatures, Asian characters, numerical digits, punctuation marks, sign language gestures, braille characters, or other individual symbols of any of the world's writing systems or other non-verbal communication systems. For example, the grapheme record may contain any phonetic alphabet, such as the International Phonetic Alphabet. The grapheme record may also including information regarding any phoneme, manipulative, syllable, orthographic, or dictionary records associated with the grapheme and instructions relating to the use of such associated records. They grapheme record may contain any further information known in the art to characterize graphemes. The grapheme record may also contain information regarding other grapheme records related to the grapheme record, such as allographs.

A syllable record may contain information relating to any representations of a syllable. For example, a syllable record may contain a unit of organization for a sequence of speech sounds, such as a syllable nucleus (e.g., a vowel) with optional initial and final margins (e.g., consonants). The syllable record may also include information regarding any phoneme, grapheme, manipulative, orthographic, or dictionary records associated with the syllable and instructions relating to the use of such associated records. They syllable record may contain any further information known in the art to characterize syllables. The syllable record may also contain information regarding other syllable records related to the syllable record. A syllable record may also be used for any type of affix, even if the affix is not a syllable.

An orthographic record may contain any orthographic rule relating to the methodology of writing a language, such as rules of spelling, hyphenation, capitalization, word breaks, emphasis, and punctuation. An orthographic record may additionally contain information about exceptions to its rules. The orthographic record may also include any phoneme, grapheme, manipulative, syllable, or dictionary records associated with the orthographic rule and instructions relating to the use of such associated records. The orthographic record may also contain information regarding other orthographic records related to the orthographic record.

A manipulative record may contain any information relating to instructions for forming a visual or tactile representation, referred to as a manipulative herein, that allows for distinguishing between phonemes and graphemes. For example, a manipulative record may contain instructions for displaying squares, circles, rectangles and other geometric objects. The manipulative record may further contain information about modifications that can be made to a manipulative, such as color, dimensionality, size, visual elements to be added or removed, etc. The manipulative record may also include information regarding any phoneme, grapheme, syllable, orthographic, or dictionary records associated with the manipulative and instructions relating to the use of such associated records. The manipulative record may also contain information regarding other manipulative records related to the manipulative record.

A dictionary record may contain any word in one or more specific languages. The dictionary record may also include definitions, etymologies, translations, inflected forms, derived forms, and other information such as the equivalent word in another language. The dictionary record may also include information regarding any phoneme, grapheme, manipulative, syllable, or orthographic records associated with the word and instructions relating to the use of such associated records. The dictionary record may also contain information regarding other dictionary records related to the dictionary record.

User Interface 106 may be composed of any type of display, such as a computer monitor or tablet screen. User Interface 106 may also consist of an interface device, such as keyboard, mouse, touchscreen. User Interface 106 may also consist of a server, which sends or receives instructions to a remote client regarding displaying information or receiving feedback from a user interface device.

Network Interface 108 may be composed of a communication system (e.g., Wifi, LTE) for allowing information or instructions to be exchanged between a user and the methods and systems described herein. In addition, network connection 108 may be used for sending or receiving information via Internet services (e.g., obtaining dictionary information, posting user results on social media).

Figure 2:
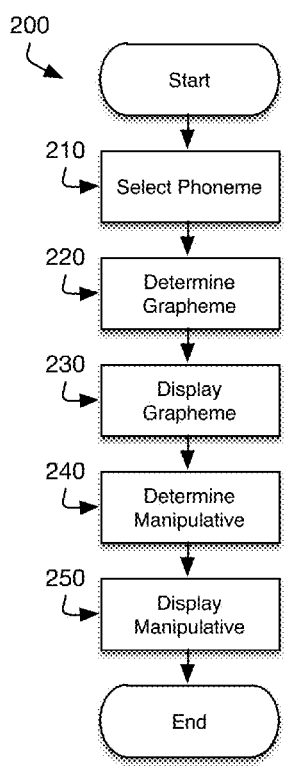
FIG. 2 shows an example of a method for determining graphemes and manipulatives associated with a phoneme.

FIG. 2 shows a method 200 for associating a manipulative or grapheme with a phoneme. At step 210, a phoneme record may be retrieved by Symbolic Parser 104, such as by the selection of a phoneme by a user via User Interface 106. At step 220, a grapheme associated with the phoneme record may be determined. For example, based on information contained in a phoneme record, Symbolic Parser 104 may review any record, such as a grapheme record, to obtain one or more graphemes. If a grapheme record indicates a default grapheme, Symbolic Parser 104 may select that grapheme in preference to other available graphemes. Alternatively, if Symbolic Parser 104 has received an instruction to use a different preference in selecting graphemes (e.g., from user settings), Symbolic Parser 104 may select a grapheme in accordance with that preference, even if such preference is contrary to a default grapheme. If a phoneme resides within an arrangement of two or more phonemes, such as a word, Symbolic Parser 104 may also review a syllable record, an orthographic record, or a dictionary record to determine which grapheme in a grapheme record is appropriate. At step 230, the grapheme determined by Symbolic Parser 104 to be associated with the phoneme may be displayed, such as via User Interface 106. At step 240, a manipulative associated with a phoneme may be determined. For example, based on information contained in a phoneme record, Symbolic Parser 104 may review any record, such as a manipulative record, to obtain one or more manipulatives. If a manipulative record indicates a default manipulative, Symbolic Parser 104 may select that manipulative in preference to other available manipulative. Alternatively, if Symbolic Parser 104 has received an instruction to use a different preference in selecting manipulatives, Symbolic Parser 104 may select a manipulative in accordance with that preference, even if such preference is contrary to a default manipulative. If a phoneme resides within an arrangement of two or more phonemes, such as a word, Symbolic Parser 104 may also review a syllable record, an orthographic record or a dictionary record to determine which manipulative in a manipulative record is appropriate. At step 250, the manipulative determined by Symbolic Parser 104 to be associated with the phoneme may be displayed, such as via User Interface 106.

Figure 3:
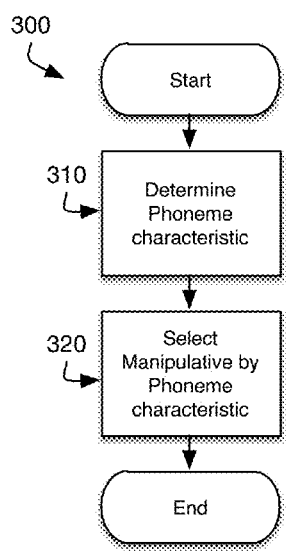
FIG. 3 shows an example of a method for determining a manipulative based on a phoneme characteristic.

FIG. 3 shows a method 300 for determining a manipulative. At step 310, a phoneme may be evaluated to determine a characteristic of the phoneme. For example, Symbolic Parser 104 may review a phoneme record associated with a phoneme to determine if it is a vowel or a consonant. As another example, Symbolic Parser 104 may review a phoneme record associated with a phoneme to determine for other characteristics, such as if the phoneme is voiced or unvoiced, the length of time the phoneme may be pronounced, or the aspiration, glottalization, or velarization of the phoneme. At step 320, a manipulative may be selected or modified based on the phoneme type. For example, Symbolic Parser 104 may review one or more manipulative records to determine which manipulative is associated with a phoneme using that characteristic. In some embodiments, Symbolic Parser 104 may rely upon information in the phoneme record to select the appropriate manipulative record. For example, Symbolic Parser 104 may determine based on the methods described herein that a circular object may be used to represent a vowel, while a triangular object may be used to represent a consonant. In addition, Symbolic Parser 104 may use information in a manipulative record to modify a manipulative based on a phoneme characteristic. For example, Symbolic Parser 104 may be instructed by a manipulative record to extend the length of a manipulative to correspond to the length of a grapheme associated with a phoneme having a certain characteristic.

Figure 4:
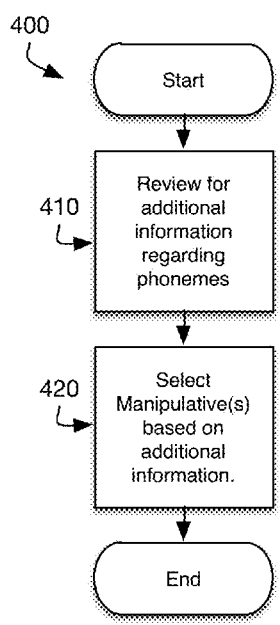
FIG. 4 shows an example of a method for determining a manipulative based on an additional information.

FIG. 4 shows a method 400 for associating a manipulative or grapheme with a phoneme based on additional information. At step 410, a review is made for additional information regarding phonemes. For example, a phoneme may be grouped with other phonemes to form a syllable or word. In such situations, Symbolic Parser 104 may use syllable records, orthographic records, or dictionary records (as well as other records) to obtain additional information regarding phonemes, such as the type and location of a phoneme relative to the type and location of another phoneme, whether a phoneme can be represented by a manipulative containing a visual cue, whether one or more phonemes should use a unigraph, digraph, or trigraph, whether phonemes form a consonant blend, or any other information relating to interactions between phonemes or their associated graphemes. At Step 420, based on the additional information, a manipulative may be selected or modified. For example, based on information contained in a syllable record, Symbolic Parser 104 may review a syllable record to obtain whether each phoneme in the syllable record is a vowel or consonant and if it is a consonant whether it is to the right or left of the vowel in a syllable. In addition, the syllable record may instruct Symbolic Parser 104 to vertically or horizontally flip a manipulative if phoneme is a consonant to the left of a vowel within the syllable.

Figures 5, 6:
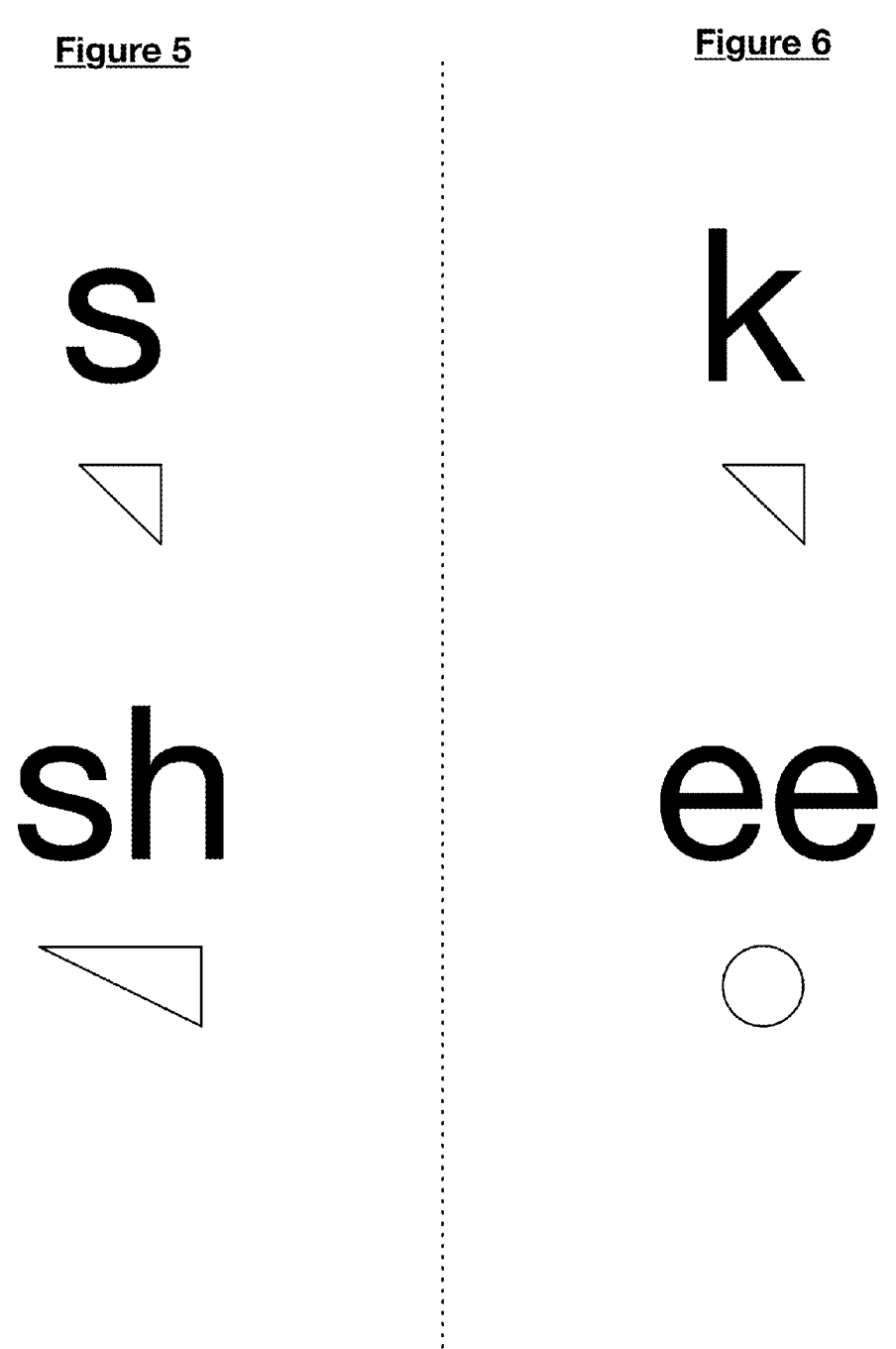

As an example of methods and system described herein, as shown in FIG. 5, a phoneme [S] may be selected. In response to the selection of phoneme [S], the grapheme "s" may be chosen by Symbolic Parser 104 for association with the phoneme [S]. Though not shown in FIG. 5, as an example, the grapheme "c" may have been chosen for association with the phoneme [S], depending on instructions in any records described herein or user settings. A triangular manipulative may be chosen by Symbolic Parser 104 for association with the phoneme [S]. For example, Symbolic Parser 104 may use the triangular manipulative because a record described herein indicated that phoneme [S] is a consonant and such a triangular manipulative should be selected. A similar process may occur with respect to the phoneme [SH], as shown in FIG. 5, to select the grapheme "sh" and a similar triangular manipulative. As shown in FIG. 5, Symbolic Parser 104 may use an elongated triangular manipulative because a record described herein indicated that the grapheme "sh" has a longer length.

As another example of methods and system described herein, as shown in FIG. 6, a phoneme [K] may be selected. In response to the selection of phoneme [K], the grapheme "k" may be chosen by Symbolic Parser 104 for association with the phoneme [K]. In addition, a triangular manipulative may be chosen by Symbolic Parser 104 for association with the phoneme [K]. For example, Symbolic Parser 104 may use the triangular manipulative because a record described herein indicated that phoneme [K] is a consonant and as such a triangular manipulative should be selected. A similar process may occur with respect to the phoneme [IY] (i.e., bee [B IY]), as shown in FIG. 6, to select the grapheme "ee". In addition, a circular manipulative may be chosen by Symbolic Parser 104 for association with the phoneme [IY]. For example, Symbolic Parser 104 may use the circular manipulative because a record described herein indicated that phoneme [IY] is a vowel and as such a circular manipulative should be selected.

As another example of methods and system described herein, as shown in FIG. 7, a phoneme [F] may be selected. In response to the selection of phoneme [F], the grapheme "f" and a triangular manipulative may be chosen by Symbolic Parser 104 for association with the phoneme [F]. A similar process may occur with respect to the phoneme [V], as shown in FIG. 7, to select the grapheme "v". In addition, because phoneme [V] is a voiced labio-dental fricative, Symbolic Parser 104 may select a manipulative as shown in FIG. 7 (i.e., with a squiggle line running along one side of the triangular manipulative). For example, Symbolic Parser 104 may by instructed by the phoneme record for [V] to use that manipulative or a manipulative record may contain instructions to modify the manipulative when a phoneme record indicates that a phoneme is voiced.

As another example of methods and system described herein, as shown in FIG. 8, the word "jump" may displayed, which consists of four phonemes. The palatal affricate [JH] (i.e., just [JH AH S T]) and the bilabial stop [P] are articulated quickly (i.e., they are consonant sounds that cannot be pronounced with any extended duration). Given this characteristic of phonemes [JH] and [P], Symbolic Parser 104 may select a manipulative as shown in FIG. 8 (i.e., with a lines radiating out of one side of the triangular manipulative) for phonemes [JH] and [P]. For example, Symbolic Parser 104 may by instructed by phoneme records for [JH] and [P] to use that manipulative or a manipulative record may contain instructions to modify the manipulative when a phoneme record indicates that a phoneme cannot be pronounced with any extended duration.

As another example of methods and system described herein, as shown in FIG. 9, the word "bike" may displayed, which consists of three phonemes. In the word "bike", the "e" is silent and associated with the phoneme [AY] (i.e., mile [M AY L]). Accordingly, Symbolic Parser 104 may select a manipulative as shown in FIG. 9 (i.e., with a larger circle connected by a line to a smaller circle) to show the connection of the silent "e" with the phoneme [AY]. For example, Symbolic Parser 104 may by instructed by phoneme records for [AY] to use that manipulative or a manipulative record may contain instructions to modify the manipulative when a phoneme record indicates that a silent letter is associated with a phoneme. In some embodiments, Symbolic Parser 104 may be instructed by other records to perform a similar selection or modification of the manipulative.

Figure 10:
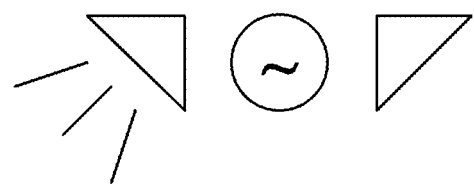
FIG. 10 shows an example of how different manipulatives may be used based on whether a phoneme is a diphthong.

As another example of methods and system described herein, as shown in FIG. 10, a word with the phoneme [OY] (i.e., oil [OY L]) may be selected. In response to the selection of phoneme [OY], the grapheme "oi" and a circular manipulative may be chosen by Symbolic Parser 104 for association with the phoneme [OY]. In addition, because phoneme [OY] is a diphthong, Symbolic Parser 104 may select a manipulative as shown in FIG. 10 (i.e., a circle with a squiggle inside). For example, Symbolic Parser 104 may be instructed by the phoneme record for [OY] to use that manipulative or a manipulative record may contain instructions to modify the manipulative when a phoneme record indicates that a phoneme is a diphthong.

Figure 11:
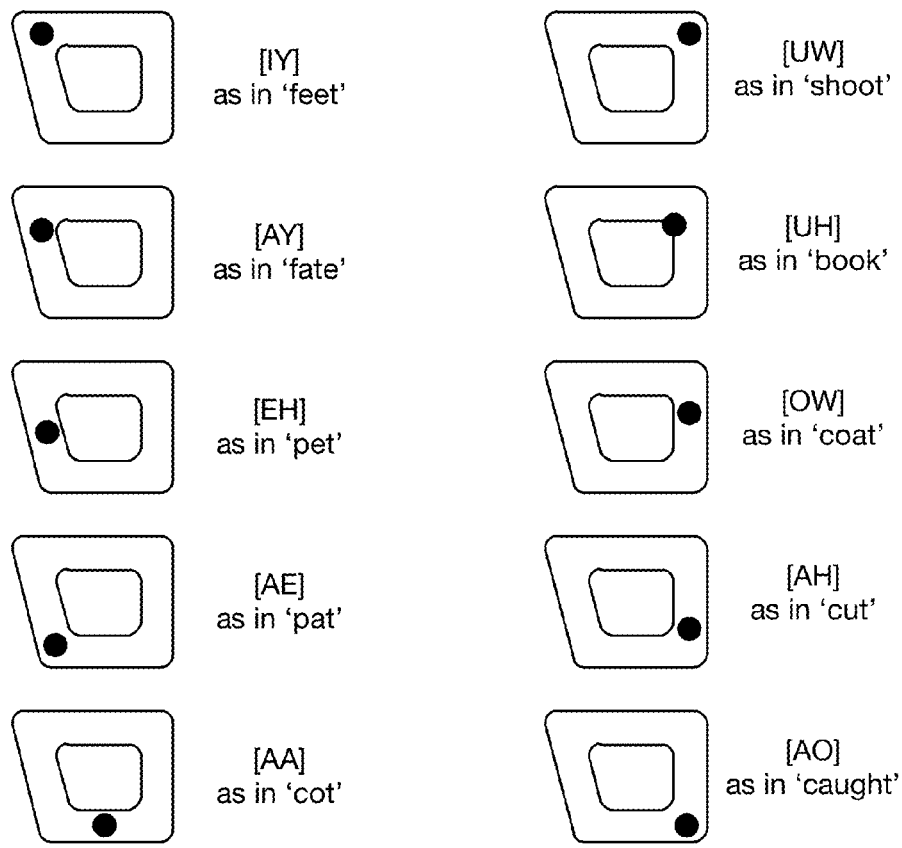
FIG. 11 shows an example of how different manipulatives may be used based on a visual organization of vowel phonemes.
Figure 12:
FIG. 12 shows a specific example of the application of a manipulative described in the context of FIG. 11.

FIG. 11 shows examples of manipulatives that may be used for various phonemes, which follow a standard organization in which vowels are organized along two spectra: the up/down positioning of the jaw, and the front/back positioning of the tongue. Such manipulatives allow for decoding cues that indicate the manner of the production of the vowel. FIG. 12 shows the application of one of those manipulatives for the phoneme [AE] (i.e., at [AE T]) in the word "bat".

Figure 13:
FIG. 13 shows an example of how different manipulatives may be used based on whether a phoneme is a nasal sound.

As another example of methods and system described herein, as shown in FIG. 13, a word with the phoneme [N] may be selected. In response to the selection of phoneme [N], the grapheme "n" and a triangular manipulative may be chosen by Symbolic Parser 104 for association with the phoneme [N]. In addition, because the phoneme [N] is a pronounced as a nasal sound, Symbolic Parser 104 may select a manipulative as shown in FIG. 13 (i.e., a triangle with a rounded edge). For example, Symbolic Parser 104 may be instructed by the phoneme record for [N] to use that manipulative or a manipulative record may contain instructions to modify the manipulative when a phoneme record indicates that a phoneme is a nasal.

Figure 14:
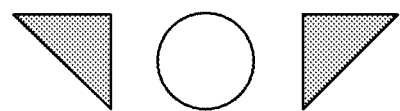
FIG. 14 shows an example of how different manipulatives may be used based on whether a consonant phoneme is located before or after a vowel phoneme.

As another example of methods and system described herein, as shown in FIG. 14, a syllable with phonemes [M] may be selected. In response to the phoneme [M], the grapheme "m" and a triangular manipulative may be chosen by Symbolic Parser 104 for association with the phoneme [M]. In addition, because the phoneme [M] is located both to the left and right of a vowel, Symbolic Parser 104 may flip a manipulative as shown in FIG. 14 depending on whether it is to the left or right of the vowel. For example, Symbolic Parser 104 may be instructed by the syllable record for "mim" to flip a manipulative horizontally for the phoneme "m" located to the left of the phoneme "i". In addition, the syllable record may contain instructions that the manipulatives for consonants be colored with a first color, while the manipulatives for vowels be colored with a second color. The use of specific colors may be specified by a syllable record or other records disclosed herein. In some embodiments, the user settings may determine the specific colors to be used. For example, the user settings may indicate a set of colors to use when a record instructs that a first, second, third, or additional colors be used. In some embodiments, the user settings may contain more than one of set of colors, which may be used depending on specific context or to avoid confusing repetition. For example, the user settings may specify to use color set A for a first syllable, color set B for a second syllable, color set C for a third syllable, and then to repeat such usage for any further syllables. In further embodiments, repeated phonemes may share common colors. For example, for the word "mim", the first "m" and second "m" may use the same color manipulative (e.g., blue), while the vowel "i" may use a different color manipulative (e.g., red). Such a color arrangement may be used to illustrate the phoneme identity aspect of phonemic awareness.

Figure 15:
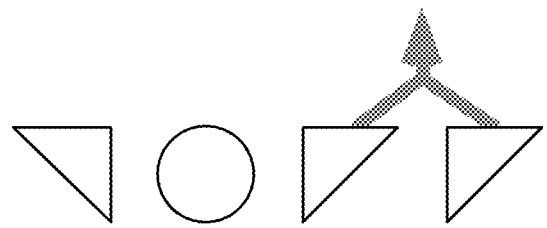
FIG. 15 shows an example of how different manipulatives may be used based on whether a grapheme is a digraph.

As another example of methods and system described herein, as shown in FIG. 15, a word "mix" with phonemes [K] and [S] may be selected. A word record for "mix" or other records disclosed herein may contain instructions that phonemes [K] and [S] should be represented by the grapheme "x". In addition, because the phonemes [K] and [S] can be represented by a unigraph, Symbolic Parser 104 may select or modify manipulative(s) as shown in FIG. 15 (i.e., two manipulatives connected together by two lines forming into an arrow). For example, Symbolic Parser 104 may be instructed by the word record or an orthographic record to select or modify manipulative(s) associated with phonemes composing unigraphs in such a manner.

Figure 16:
FIG. 16 shows an example of how different manipulatives may be used based on whether phonemes involve a consonant blend.

As another example of methods and system described herein, as shown in FIG. 16, a word "glass" with phonemes [G] and [L] may be selected. A word record for "glass" or other records disclosed herein may contain instructions that phonemes [G] and [L] are a consonant blend. As a result of such instructions, Symbolic Parser 104 may select or modify manipulative(s) as shown in FIG. 16 (i.e., two manipulatives connected by a curved line). For example, Symbolic Parser 104 may be instructed by the word record or an orthographic record to select or modify manipulative(s) associated with phonemes composing consonant blends in such a manner.

Figure 17:
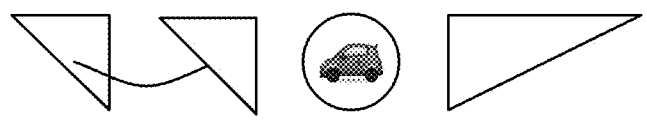
FIG. 17 shows an example of how different manipulatives may incorporate visual images.

As another example of methods and system described herein, as shown in FIG. 17, a word "stark" with phoneme [AA R] (i.e., car [KM R]) may be selected. A phoneme record for [AA R] may contain instructions that phonemes [AA R] may use a manipulative containing a visual cue. As a result of such instructions, Symbolic Parser 104 may select or modify manipulative(s) as shown in FIG. 17 (i.e., a manipulative containing a visual image of word that uses the same vowel phoneme).

Figure 18:
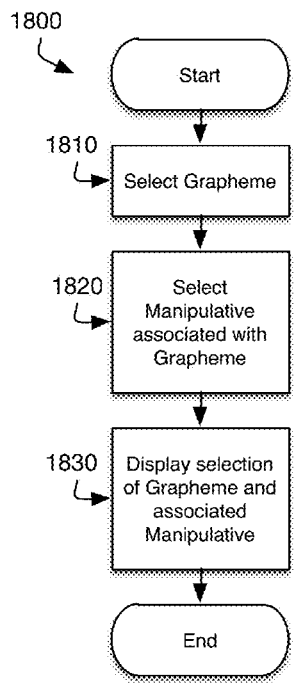
FIG. 18 shows an example of a method for selecting a grapheme and manipulative via a grapheme.

FIG. 18 shows a method 1800 for selecting a grapheme and a manipulative via the grapheme. At step 1810, a grapheme may be selected, such as by the selection of a grapheme by a user via User Interface 106. At step 1820, a manipulative associated with the grapheme may be determined. For example, Symbolic Parser 104 upon being notified of the selection of a grapheme, may identify the associated manipulative to User Interface 106. At step 1830, the selection of the grapheme and associated manipulative may be displayed, such as via User Interface 106.

Figure 19:
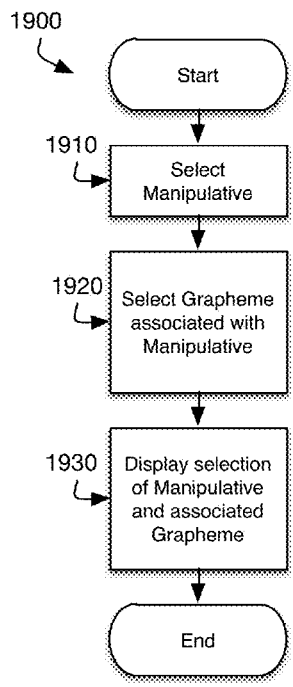
FIG. 19 shows an example of a method for selecting a grapheme and manipulative via a manipulative.

FIG. 19 shows a method 1900 for selecting a grapheme and a manipulative via the manipulative. At step 1910, a manipulative may be selected, such as by the selection of a manipulative by a user via User Interface 106. At step 1920, a grapheme associated with the manipulative may be determined. For example, Symbolic Parser 104 upon being notified of the selection of a manipulative, may identify the associated grapheme to User Interface 106. At step 1930, the selection of the manipulative and associated grapheme may be displayed, such as via User Interface 106.

In some embodiments, when a grapheme or manipulative is selected, any other graphemes or manipulatives within a syllable may also be selected. For example, Symbolic Parser 104 may review a syllable record to determine other phonemes or graphemes in a syllable based on the selection of a grapheme or manipulative. Symbolic Parser 104 may then identify the additional graphemes or manipulatives to User Interface 106 and the selection of the graphemes and associated manipulatives may be displayed, such as via User Interface 106.

In some embodiments, a syllable (e.g., an affix) may be associated with a manipulative. Methods 1800 and 1900 may also be used in this context by substituting such a syllable for the role of the grapheme described in these methods.

Figure 20:
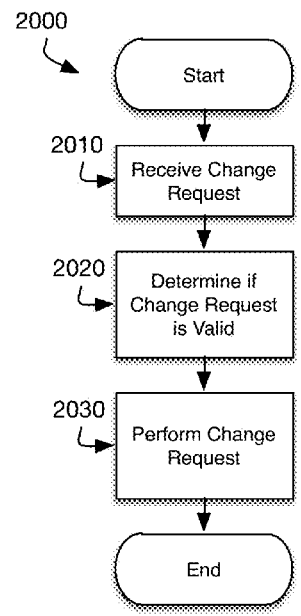
FIG. 20 shows an example of a method for handling a change request.

FIG. 20 shows a method 2000 for receiving and implementing a change request. At step 2010, a change request may be received. For example, via User Interface 106 a change request may be generated by a user requesting to add, delete, substitute, modify, relocate, or otherwise change a grapheme, a manipulative, a syllable (e.g., an affix), etc. The Change Request may then be received by Symbolic Parser 104 for evaluation. At step 2020, a determination may be made to determine if the change request is valid. For example, Symbolic Parser 104 may determine whether the change request is valid based on phoneme records, grapheme records, manipulative records, syllable records, orthographic records, dictionary records, user settings, etc. Validity may also be determined based on the phonotactic, orthographic, or instructional validity. At step 2030, if the change request is valid, the change requested may be implemented. For example, if Symbolic Parser 104 determines a Change Request is valid, it may implement the Change Request based on instructions contained in phoneme records, grapheme records, manipulative records, syllable records, orthographic records, dictionary records, user settings, etc.

Figure 21:
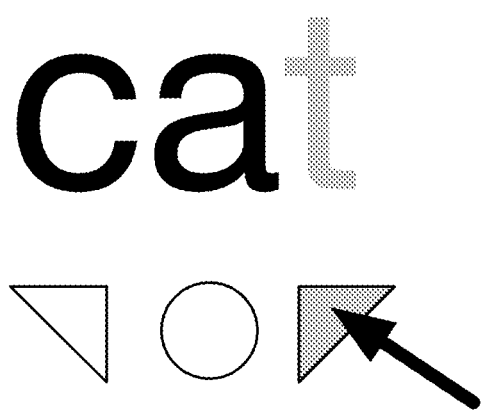
FIG. 21 shows an example of selecting a grapheme and manipulative.

As an example of methods and system described herein, as shown in FIG. 21, a word "cat" with phoneme [T] may be presented. Via User Interface 106, a manipulative associated with phoneme [T] may be selected. As a result of such a selection, Symbolic Parser 104 may determine that grapheme "t" should also be selected and may send that information to User Interface 106, which may then display the selection of both grapheme "t" and the manipulative associated with grapheme "t". Alternatively, via User Interface 106, a grapheme associated with phoneme [T] may be selected. As a result of such a selection, Symbolic Parser 104 may determine that a manipulative associated with grapheme "t" should also be selected and may send that information to User Interface 106, which may then display the selection of both grapheme "t" and the manipulative associated with grapheme "t".

Figure 22:
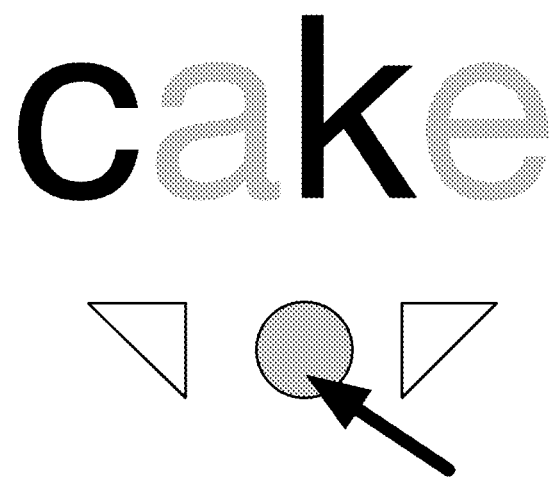
FIG. 22 shows an example of selecting a grapheme and manipulative involving a silent letter.

As another example of methods and system described herein, as shown in FIG. 22, a word "cake" with phoneme [AY] (i.e., may [M AY]) may be presented. Via User Interface 106, a manipulative associated with phoneme [AY] may be selected. As a result of such a selection, Symbolic Parser 104 may determine that grapheme "a e" should also be selected and may send that information to User Interface 106, which may then display the selection of both grapheme "a e" and the manipulative associated with grapheme "a e". Alternatively, via User Interface 106, a grapheme associated with phoneme [AY] may be selected. As a result of such a selection, Symbolic Parser 104 may determine that a manipulative associated with grapheme "a e" should also be selected and may send that information to User Interface 106, which may then display the selection of both grapheme "a e" and the manipulative associated with grapheme "a e". As shown in this example, a grapheme does not need to consist of consecutive letters or symbols, but may be separated by other graphemes, such as when a grapheme record (or any other type of record) indicates that part of the grapheme should be located elsewhere in a syllable, word, etc.

Figure 23:
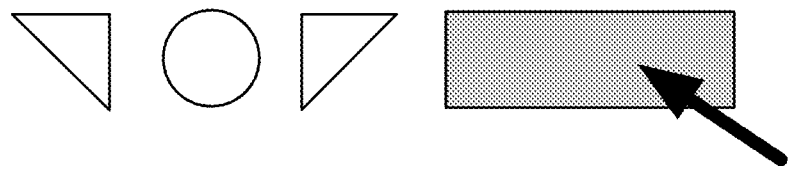
FIG. 23 shows an example of selecting an affix and manipulative.

As another example of methods and system described herein, as shown in FIG. 23, a word "hoping" with suffix "-ing" may be presented. Via User Interface 106, a manipulative associated with suffix "-ing" may be selected. As a result of such a selection, Symbolic Parser 104 may determine that the graphemic unit "ing" should also be selected and may send that information to User Interface 106, which may then display the selection of both the graphemic unit "ing" and the manipulative associated with the graphemic unit "ing". Alternatively, via User Interface 106, a grapheme associated with suffix "-ing" may be selected. As a result of such a selection, Symbolic Parser 104 may determine that a manipulative associated with the suffix "-ing" should also be selected and may send that information to User Interface 106, which may then display the selection of both the graphemic unit "ing" and the manipulative associated with the graphemic unit "ing".

Figure 24:
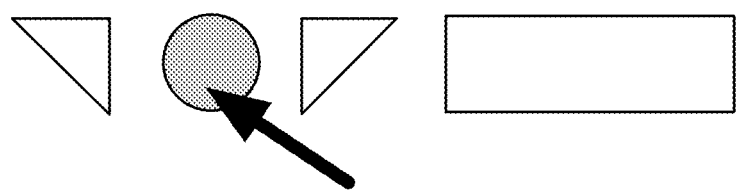
FIG. 24 shows an example of selecting a grapheme and manipulative where a silent letter was suppressed by an orthographic rule.

As another example of methods and system described herein, as shown in FIG. 24, a word "hoping" with suffix "-ing" may be presented. Via User Interface 106, a manipulative associated with phoneme [OW] (i.e., coat [K OW T]) may be selected. As a result of such a selection, Symbolic Parser 104 may determine that visible grapheme "o" should also be selected and may send that information to User Interface 106, which may then display the selection of both visible grapheme "o" and the manipulative associated with grapheme "o". In addition, Symbolic Parser 104 may determine that suppressed grapheme "e" should also be selected and may send that information to User Interface 106, which may then display the selection of both suppressed grapheme "e" along with visible grapheme "o". This may occur, as shown in FIG. 24, where part of a grapheme is suppressed or modified by the addition of an affix. In this example, the suppressed grapheme "e" has been suppressed by the addition of the suffix "-ing" to the word "hope". When the manipulative or visible portion of the grapheme associated with phoneme [OW] is selected, Symbolic Parser 104 or User Interface 106 may determine that a suppressed or modified portion of a grapheme be revealed (e.g., a silent "e"). In some embodiments, Symbolic Parser 104 or User Interface 106 may determine that additional graphemes or manipulatives may also be revealed, such as if the addition of an affix removes graphemes from a word (e.g., due to an orthographic convention) that would be otherwise present. As shown in the figure, such modified or suppressed portions of a grapheme (or additional graphemes) may be shown in a smaller font where they would occur (or at an offset) if the affix were not present. In addition, the revealed partial grapheme or additional graphemes may be rotated for further clarity. Any revelation of suppressed or modified manipulatives may also be treated in a similar fashion. Alternatively, via User Interface 106, a grapheme associated with phoneme (such as visible grapheme "o" in FIG. 24) can be selected to achieve the same as described in this example.

Figure 25:
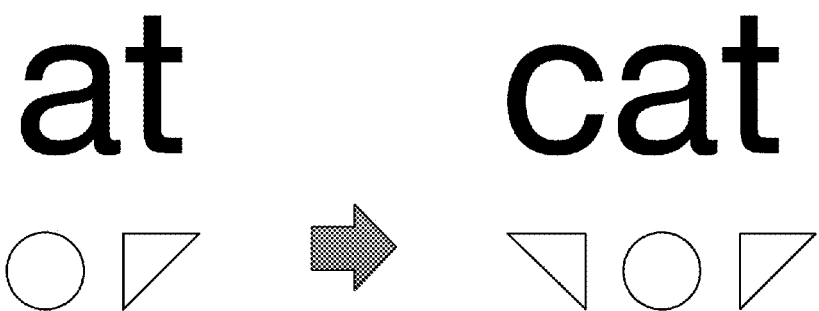
FIG. 25 shows an example of a change request to add a phoneme, grapheme, or manipulative.

As another example of methods and system described herein, as shown in FIG. 25, Symbolic Parser 104 may receive a change request to add the grapheme "c" or its associated phoneme to the word "at". If Symbolic Parser 104 determines that the change request is valid as described herein then it may perform the change or send instructions to a User Interface 106 to display the resulting word "cat" along with its constituent manipulatives.

Figure 26:
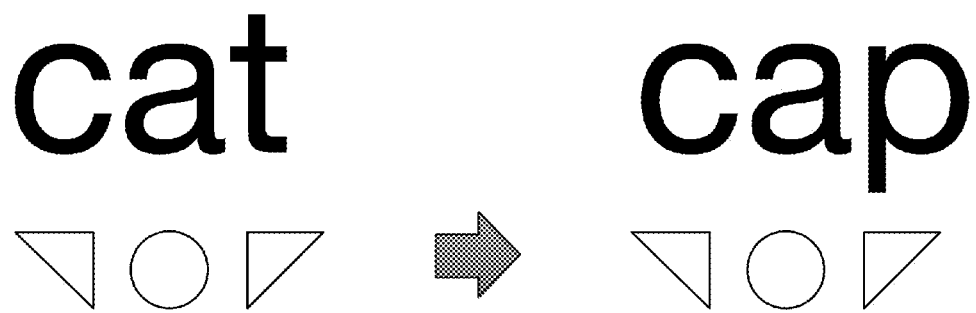
FIG. 26 shows an example of a change request to substitute a phoneme, grapheme, or manipulative.

As another example of methods and system described herein, as shown in FIG. 26, Symbolic Parser 104 may receive a change request to substitute the grapheme "t" or its associated phoneme to the grapheme "p" or its associated phoneme. If Symbolic Parser 104 determines that the change request is valid as described herein then it may perform the change or send instructions to a User Interface 106 to display the resulting word "cap" along with its constituent manipulatives.

Figure 27:
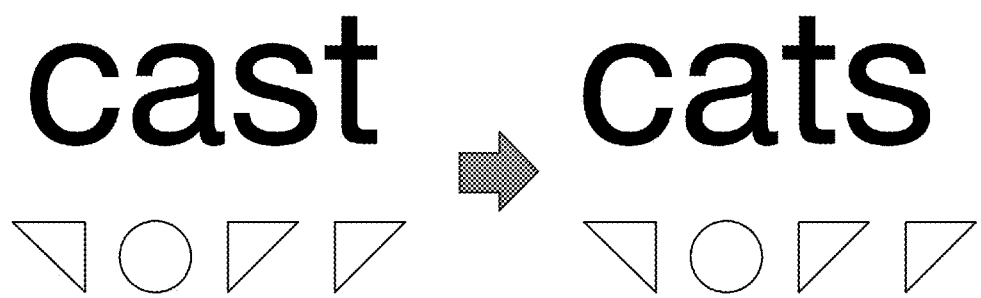
FIG. 27 shows an example of a change request to relocate a phoneme, grapheme, or manipulative.

As another example of methods and system described herein, as shown in FIG. 27, Symbolic Parser 104 may receive a change request to relocate the grapheme "s" or its associated phoneme in the word "cast". If Symbolic Parser 104 determines that the change request is valid as described herein then it may perform the change or send instructions to a User Interface 106 to display the resulting word "cats" along with its constituent manipulatives.

Figure 28:
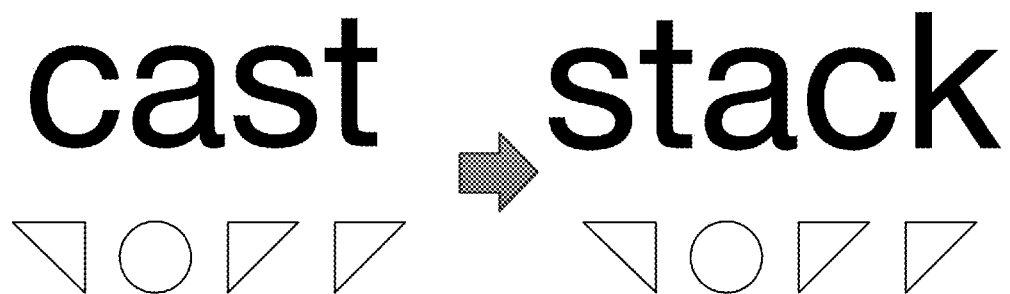
FIG. 28 shows an example of a change request to relocate two phonemes, graphemes, or manipulatives and the resulting change of a grapheme.

As another example of methods and system described herein, as shown in FIG. 28, Symbolic Parser 104 may receive a change request to relocate the grapheme "c" (or its associated phoneme) and grapheme "a" (or its associated phoneme) in the word "cast". If Symbolic Parser 104 determines that the change request is valid as described herein then it may perform the change or send instructions to a User Interface 106 to display the resulting word "stack" along with its constituent manipulatives. This example demonstrates that a change request may contain a request to change more than one phoneme, grapheme, or its associated manipulative or that Symbolic Parser 104 may evaluate validity for a change request based on a group of change requests. In addition, as shown in FIG. 28, the relocation of grapheme "c" or its associated phoneme to form the word "stack" results in a change of the grapheme to "ck". This change in the grapheme "c" to grapheme "ck" may result from Symbolic Parser 104 reviewing instructions regarding the proper grapheme to use in phoneme, grapheme, orthographic, or other records.

As another example of methods and system described herein, as shown in FIG. 29, Symbolic Parser 104 may receive a change request to change the phoneme [AE] (i.e., cat [K AE T]) in the word "batch" to the phoneme [IY] (i.e., bee [B IY]). If Symbolic Parser 104 determines that the change request is valid as described herein then it may perform the change or send instructions to a User Interface 106 to display the resulting word "beach" along with its constituent manipulatives. This example demonstrates that a change request may contain a request to substitute a phoneme, grapheme, or manipulative. In addition, as shown in FIG. 29, the change to phoneme [IY] to form the word "beach" results in a change of the grapheme "tch" to grapheme "ch". Also shown is a change in the length of the manipulative associated with phoneme [CH], which is shortened to show its correspondence to a digraph, rather than a trigraph. Such changes in the grapheme and manipulative associated with phoneme [CH] may result from Symbolic Parser 104 reviewing instructions regarding the proper grapheme to use in phoneme, grapheme, orthographic, or other records.

As another example of methods and system described herein, as shown in FIG. 30, Symbolic Parser 104 may receive a change request to change the phoneme [P] in the word "hoping" to the phoneme [N]. If Symbolic Parser 104 determines that the change request is valid as described herein then it may perform the change or send instructions to a User Interface 106 to display the resulting word "honing" along with its constituent manipulatives. This example demonstrates that a change request may contain a request to make a change even when an affix is present.

If the change request is valid, but the affix is not appropriate, for example, as determined by Symbolic Parser 104 reviewing instructions regarding the proper affix to use in phoneme, grapheme, orthographic, or other records, the affix may be changed or deleted as indicated by such records. For example, if Symbolic Parser 104 received a change request to change the phoneme [P] in the word "hoping" to the phoneme [T], Symbolic Parser 104 may determine that the suffix "-ing" is invalid and remove it and its associated manipulative to form the nonsense word "hote". In other embodiments, if the change request is valid, but the affix is not appropriate, for example, as determined by Symbolic Parser 104 reviewing instructions regarding the proper affix to use in phoneme, grapheme, orthographic, or other records, a phoneme may be changed or deleted as indicated by such records. For example, if Symbolic Parser 104 received a change request to change the phoneme [P] in the word "hoping" to the phoneme [T], Symbolic Parser 104 may determine that the phoneme [OW] (i.e., coat [K OW T]) should be changed to phoneme [IY] (i.e., bee [B IY]) and thus modify it and its associated manipulative and grapheme to form the word "heating".

As another example of methods and system described herein, as shown in FIG. 31, Symbolic Parser 104 may receive a change request to add the suffix "ing" to the word "hop". If Symbolic Parser 104 determines that the change request is valid as described herein then it may perform the change or send instructions to a User Interface 106 to display the resulting word "hopping" along with its constituent manipulatives. This example demonstrates that a change request may contain a request to add, remove, substitute, or otherwise change an affix. In addition, as shown in FIG. 31, the addition of suffix "ing" to form the word "hopping" results in a change of the grapheme "p" to grapheme "pp". Also shown is a change in the length of the manipulative associated with phoneme [P], which is lengthened to show its correspondence to a digraph, rather than a unigraph. Such changes in the grapheme and manipulative associated with phoneme [P] may result from Symbolic Parser 104 reviewing instructions regarding the proper grapheme to use in phoneme, grapheme, orthographic, or other records.

As another example of methods and system described herein, as shown in FIG. 32, Symbolic Parser 104 may receive a change request to change the suffix "-ing" in the word "hoping" to the suffix "-ful". If Symbolic Parser 104 determines that the change request is valid as described herein then it may perform the change or send instructions to a User Interface 106 to display the resulting word "hopeful" along with its constituent manipulatives. This example demonstrates that a change request may contain a request to add, remove, substitute, or otherwise change an affix. In addition, as shown in FIG. 32, the change of suffix to form the word "hopeful" results in a change of the grapheme "o e" by revealing the suppressed grapheme "e". Such changes in the grapheme and manipulative associated with phoneme [OW] (i.e., coat [K OW T]) may result from Symbolic Parser 104 reviewing instructions regarding the proper grapheme to use in phoneme, grapheme, orthographic, or other records.

As another example of methods and system described herein, as shown in FIG. 33, Symbolic Parser 104 may receive a change request to remove the suffix "-ing" in the word "hoping". If Symbolic Parser 104 determines that the change request is valid as described herein then it may perform the change or send instructions to a User Interface 106 to display the resulting word "hope" along with its constituent manipulatives. This example demonstrates that a change request may contain a request to add, remove, substitute, or otherwise change an affix. In addition, as shown in FIG. 33, the change of suffix to form the word "hoping" to "hope" results in a change of the grapheme "o e" by revealing the suppressed grapheme "e". Such changes in the grapheme and manipulative associated with phoneme [OW] (i.e., coat [K OW T]) may result from Symbolic Parser 104 reviewing instructions regarding the proper grapheme to use in phoneme, grapheme, orthographic, or other records.

As another example of methods and system described herein, as shown in FIG. 34, Symbolic Parser 104 may receive a change request to add a prefix "re" to the word "strict". If Symbolic Parser 104 determines that the change request is valid as described herein then it may perform the change or send instructions to a User Interface 106 to display the resulting word "restrict" along with its constituent manipulatives. This example demonstrates that a change request may contain a request to add, remove, substitute, or otherwise change an affix using a different manipulative. As shown in FIG. 34, the addition of the prefix "re-" to form the word "restrict" results in a manipulative "re-". While in the preferred embodiments the manipulative may be represented by abstract shapes, in some embodiments as shown in this example the manipulative may take the form of common affixes or other informational shapes (e.g., pictures). The type of manipulative chosen for an affix may result from Symbolic Parser 104 reviewing instructions regarding the proper manipulative for an affix in phoneme, grapheme, orthographic, or other records.

As another example of methods and system described herein, as shown in FIG. 35, Symbolic Parser 104 may receive a change request to substitute a prefix "re-" in the word "constrict". If Symbolic Parser 104 determines that the change request is valid as described herein then it may perform the change or send instructions to a User Interface 106 to display the resulting word "restrict" along with its constituent manipulatives.

As another example of methods and system described herein, as shown in FIG. 36, Symbolic Parser 104 may receive a change request to delete a prefix "con-" in the word "constrict". If Symbolic Parser 104 determines that the change request is valid as described herein then it may perform the change or send instructions to a User Interface 106 to display the resulting word "strict" along with its constituent manipulatives.

Figure 37:
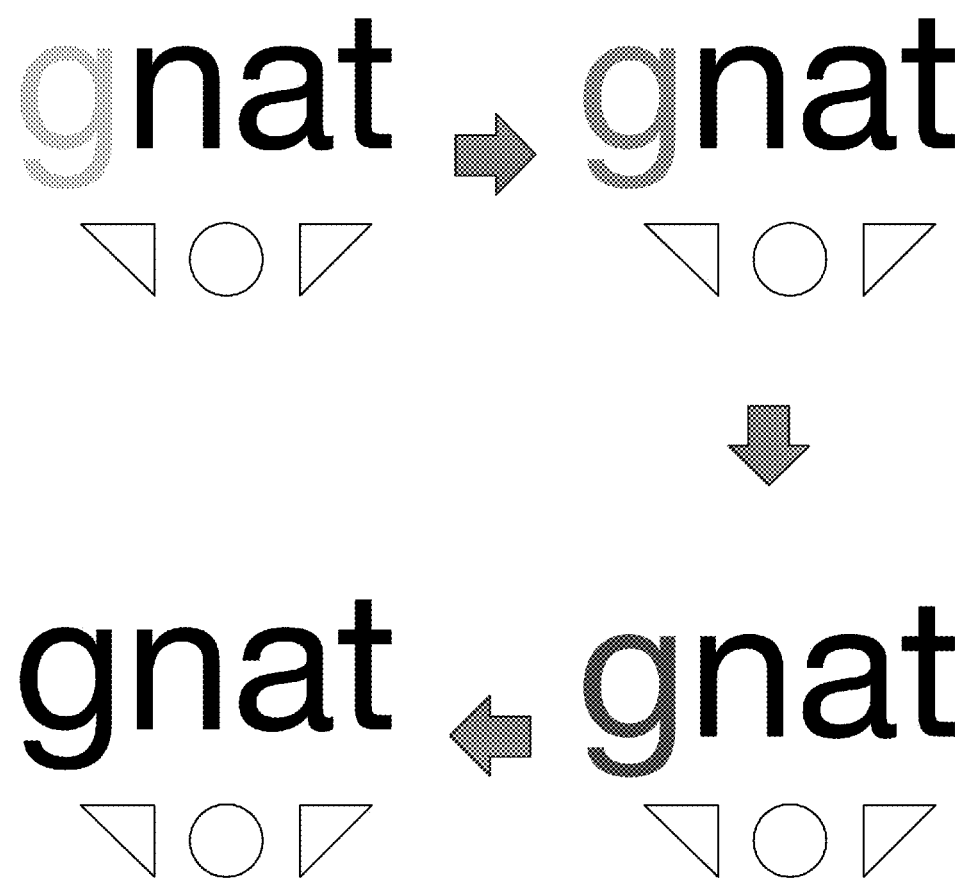
FIG. 37 shows an example of where a grapheme changes over time.

As another example of methods and system described herein, as shown in FIG. 37, a User Interface 106 may change the form of a silent letter in a grapheme over time. This may occur based on instructions to User Interface 106 from a user or due to information contained in user settings or other records disclosed herein. FIG. 37 shows, in a clockwise fashion, how the silent letter of a grapheme changes from transparent to opaque over time. In some embodiments, a silent letter may cycle presented in this manner may repeatedly transition from a transparent form to an opaque form to aid a user in remembering the spelling and proper pronunciation of a word with silent letters.

As another example of methods and system described herein, as shown in FIG. 38, a User Interface 106 may be presented with a word with an informational button (as shown with the "i" in the circle next to "graph". If the information button is selected, additional information about the word, such as information from a dictionary record, may retrieved via Symbolic Parser 104 and displayed via User Interface 106. An example of such an informational display for the word "graph" is shown in FIG. 39. The informational display may also contain other information other than what is contained in a dictionary record, such as a selectable item to search the Internet for the word or to use a specific internet service to retrieve information about the word (e.g., dictionary.com, wiktionary.com).

As another example of methods and system described herein, as shown in FIG. 40, a word may presented within or near a visual image, such as a visual image representing the word. The presentation of a visual image in association with a word may result from Symbolic Parser 104 reviewing a dictionary record (or other records) for an image associated with a word and if permitted, such as by user settings, then providing the image to User Interface 106 for display to the user. In some embodiments, the user settings may specify that one or more graphemes be omitted when a visual image in association with a word is presented.

As another example of methods and system described herein, as shown in FIG. 41, Symbolic Parser 104 may receive a change request to change the syllable "lem" in the nonsense word "lempit". If Symbolic Parser 104 determines that the change request is valid as described herein then it may perform the change or send instructions to a User Interface 106 to display the resulting word "cockpit" along with its constituent manipulatives. This example demonstrates that a change request may contain a request to change a syllable. In addition, as shown in FIG. 41, the syllable change to form the word "cockpit" requires the usage of the grapheme "ck" associated with phoneme [K]. Also shown in the example is that the orientation of manipulatives for consonants within each syllable are based on their location relative to a vowel phoneme in each syllable. Such changes in the graphemes and manipulatives relating to each syllable may result from Symbolic Parser 104 reviewing instructions regarding the proper grapheme and manipulative to use in phoneme, grapheme, orthographic, or other records.

As another example of methods and system described herein, as shown in FIG. 42, Symbolic Parser 104 may receive a change request to rearrange the syllables in the nonsense word "lempit". If Symbolic Parser 104 determines that the change request is valid as described herein then it may perform the change or send instructions to a User Interface 106 to display the resulting word "pitlem" along with its constituent manipulatives. This example demonstrates that a change request may contain a request to change a syllable, such as changing its locations.

As another example of methods and system described herein, as shown in FIG. 43, Symbolic Parser 104 may receive a change request to switch phonemes residing in different syllables (e.g., the phoneme associated with grapheme "ck" with the phoneme associated with grapheme "p"). If Symbolic Parser 104 determines that the change request is valid as described herein then it may perform the change or send instructions to a User Interface 106 to display the resulting word "copkit" along with its constituent manipulatives. This example demonstrates that a change request may contain a request to change phonemes between different syllables. In addition, as shown in FIG. 43, the switch of the phonemes to form the word "copkit" requires the usage of the grapheme "k" associated with phoneme [K] rather than grapheme "ck". Such changes in the graphemes and manipulatives relating to each syllable may result from Symbolic Parser 104 reviewing instructions regarding the proper grapheme and manipulative to use in phoneme, grapheme, orthographic, or other records.

In some embodiments, a syllable may have an additional manipulative independent of any graphemes or manipulatives associated with the constituent phonemes of the syllable. For example, a hyphen or an accent mark may be a manipulative associated with a syllable record. In such embodiments, Symbolic Parser 104 may use the same methods as described herein for graphemes with respect to their association or interaction with manipulatives to handle syllables that have an additional, independent manipulative. In further embodiments, a syllable with an additional, independent manipulative may not contain any phonemes. For example, a syllable record may have no graphemes or manipulatives associated with the constituent phonemes of the syllable, but may have a manipulative associated with the syllable in the form of a hyphen. In some embodiments, a change request can include transferring an additional, independent manipulative associated with a first syllable to a second syllable.

In some embodiments, a grapheme record may represent elements such as a hyphen or other punctuation marks without having any association with any phoneme.

As another example of methods and system described herein, as shown in FIG. 44, Symbolic Parser 104 may receive a change request to change the location of a hyphen in a word, such as "rock-rip". If Symbolic Parser 104 determines that the change request is valid as described herein then it may perform the change or send instructions to a User Interface 106 to display the resulting word "ro-crip" along with its constituent manipulatives. This example demonstrates that a change request may contain a request to relocate a hyphen in a word, such as nonsense word, to form different syllables. In addition, as shown in FIG. 44, the relocation of the hyphen to form the word "ro-crip" requires the usage of the grapheme "c" associated with phoneme [K] rather than grapheme "ck". Such changes in the graphemes and manipulatives relating to each syllable may result from Symbolic Parser 104 reviewing instructions regarding the proper grapheme and manipulative to use in phoneme, grapheme, orthographic, or other records.

As another example of methods and system described herein, as shown in FIG. 45, Symbolic Parser 104 may receive a change request to change a diacritic (e.g., an accent mark). If Symbolic Parser 104 determines that the change request is valid as described herein then it may perform the change or send instructions to a User Interface 106 to switch the diacritic and make any further modifications. This example demonstrates that a change request may contain a request to relocate an accent mark from one syllable to another. In addition, as shown in FIG. 45, the relocation of the accent mark requires changing which manipulatives are elevated (which may be done to visually cue where emphasis should occur during pronunciation). Such changes in the accent mark, graphemes, and manipulatives relating to each syllable may result from Symbolic Parser 104 reviewing instructions regarding the proper grapheme and manipulative to use in phoneme, grapheme, orthographic, or other records.

In some embodiments, clicking on a manipulative, grapheme, syllable, etc. may result in audio or visual images being played via User Interface 106. For example, if a grapheme or manipulative associated with a phoneme is selected, Symbolic Parser 106 may review a phoneme record associated with the phoneme for a sound or video recording related to the phoneme and instruct User Interface 106 to play such a recording the user. Symbolic Parser 106 may also perform a similar action for other selections, such as selection of a syllable, affix, word, etc.

To determine validity of a Change Request, Symbolic Parser 106 may undertake any method disclosed herein. In addition, it may review any record disclosed herein for instructions indicating whether such a Change Request is valid. Symbolic Parser 106 may also evaluate validity of a Change Request based on other metrics disclosed herein. For example, records disclosed herein may include one or more phonotactic, orthographic, or instructional values relating to the phonotactic, orthographic, or instructional validity of information they contain.

In this context, a word record for "sphlet" may have low English phonotactic value, as [S F L] is not a valid consonant blend in English. A word record for "psem" may have a higher phonotactic value, but a low orthographic value because in English the digraph "ps" is unlikely to represent [S] before [EH] (i.e., red [R EH D]). A word record for "sor" may have high phonotactic and orthographic values, but may have a lower instructional value because it is a misspelling of the word "soar" or "sore". A word record for "hook" composed of the phonemes [HH UW K], that is, with the vowel sound [UW] (i.e., shoe [SH UW]), may have high phonotactic and orthographic values, but may have a lower instructional value because it is a mispronunciation of the real English word "hook" composed of the phonemes [HH UH K], that is, with the vowel sound [UH] (i.e., book [B UH K]).

In addition, Symbolic Parser 104 may consult sets of rules, threshold values, or instructions contained in the user settings to evaluate validity. For example, the user settings may specify that only words or syllables above a certain phonotactic, orthographic, or instructional value are valid. Thus, if Symbolic Parser 104 receives a change request that would result in a word or syllable with a phonotactic, orthographic, or instructional value below what is required by the user settings, it will reject the change request. In some embodiments, the user settings may also instruct the Symbolic Parser 104 to adjust information relating to any determination of validity within the user settings or in other records.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module", "computing device" or "system." Furthermore, aspects of the present invention may take the form of a computer program product embodied in one or more computer readable medium(s) having computer readable program code embodied thereon.

Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations or block diagrams of methods, apparatus (systems) and computer program products according to embodiments of the invention. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart or block diagram block or blocks. In the following description, certain specific details of programming, software modules, user selections, network transactions, database queries, database structures, etc. are omitted to avoid obscuring the invention. Those of ordinary skill in computer sciences will comprehend many ways to implement the invention in various embodiments, the details of which can be determined using known technologies.

Furthermore, the described features, structures, or characteristics may be combined in any suitable manner in one or more embodiments. In general, the methodologies of the present invention are advantageously carried out using one or more digital processors, for example the types of microprocessors that are commonly found in servers, personal computers, tablets, smartphones and all manner of desktop or portable electronic appliances.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures or may be omitted. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions. In addition, any references to steps of a methodology are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings and descriptions provided herein. All references cited herein are expressly incorporated by reference.

What is claimed is:

1. A computer operable method for transforming phonemes, graphemes, and other language structures into interactive elements, comprising the steps of:
    receiving a word, wherein the word consists of a group of phonemes;
    forming a group of graphemes, wherein the group of graphemes is constructed using information relating to the group of phonemes; and
    for each phoneme or grapheme in the group of phonemes or group of graphemes, determining a graphical manipulative, wherein each graphical manipulative is constructed using information relating to the phoneme or grapheme and each graphical manipulative corresponds to an individual phoneme or grapheme within the group of phonemes or group of graphemes, to form a group of graphical manipulatives;
    displaying the group of graphemes and the group of graphical manipulatives;
    receiving a selection of a first graphical manipulative and expanding the selection to include a first phoneme and first grapheme associated with the first graphical manipulative;
    receiving a change request via the first graphical manipulative, wherein the change request contains a request to alter the first phoneme or first grapheme associated with the first graphical manipulative;
    evaluating the change request to determine a phonotactic validity value, an orthographic validity value, or an instructional validity value of the change request;
    approving the change request only if the phonotactic validity value, the orthographic validity value, or the instructional validity value are allowed by one or more validity thresholds; and
    if the change request is approved, determining any changes in the group of phonemes, the group of graphemes, or the group of graphical manipulatives and updating the display of the group of graphemes and the group of graphical manipulatives.

2. A computer operable method according to claim 1, wherein the selection of the first graphical manipulative results in playing of an audio or video file.

3. A computer operable method accord to claim 2, wherein the audio or video file demonstrates an articulation or manner of production of the first phoneme.

4. A computer operable method according to claim 1, where in each graphical manipulative is represented by colored shapes.

5. A computer operable method according to claim 1, comprising the further steps of:
    receiving a selection of an affix for the word;
    determining an affix graphical manipulative corresponding to the affix, wherein the affix graphical manipulative is constructed using information relating to the affix; and
    displaying the affix and affix graphical manipulative along with the group of graphemes and the group of graphical manipulatives.

6. A computer operable method according to claim 5, where in displaying the group of graphemes and the group of graphical manipulatives, an option is provided to display any grapheme suppressed by addition of the affix to the word.

7. A computer operable method according to claim 1, where in displaying the group of graphemes and the group of graphical manipulatives, a portion of the group of graphemes and an associated portion of the group of graphical manipulatives are omitted from display.

8. A computer operable method according to claim 1, wherein the size of each graphical manipulative is based on whether a phoneme associated with the graphical manipulative is a digraph or a trigraph.

* * * * *